(No Model.) 5 Sheets—Sheet 1.

H. A. BARNARD, J. B. CORNWALL & J. S. LEAS.
GRAIN SEPARATOR.

No. 260,150. Patented June 27, 1882.

(No Model.) 5 Sheets—Sheet 2.
H. A. BARNARD, J. B. CORNWALL & J. S. LEAS.
GRAIN SEPARATOR.

No. 260,150. Patented June 27, 1882.

(No Model.) 5 Sheets—Sheet 5.

H. A. BARNARD, J. B. CORNWALL & J. S. LEAS.
GRAIN SEPARATOR.

No. 260,150. Patented June 27, 1882.

Witnesses:
H. C. McArthur
W. R. Keyworth

Inventors:
H. A. Barnard
J. B. Cornwall
J. S. Leas
per Th. Alexander
Attorney.

UNITED STATES PATENT OFFICE.

HEMAN A. BARNARD AND JOHN B. CORNWALL, OF MOLINE, AND J. SILAS LEAS, OF ROCK ISLAND, ILLINOIS.

GRAIN-SEPARATOR

SPECIFICATION forming part of Letters Patent No. 260,150, dated June 27, 1882.

Application filed March 22, 1882. (No model.)

*To all whom it may concern:*

Be it known that we, HEMAN A. BARNARD and JOHN B. CORNWALL, of Moline, and J. SILAS LEAS, of Rock Island, all in the county of Rock Island and State of Illinois, have invented certain new and useful Improvements in Grain-Separators; and we do hereby declare that the following is a full, clear, and exact description thereof, reference being had to the accompanying drawings, and to the letters of reference marked thereon, which form part of this specification, in which—

Figure 1:
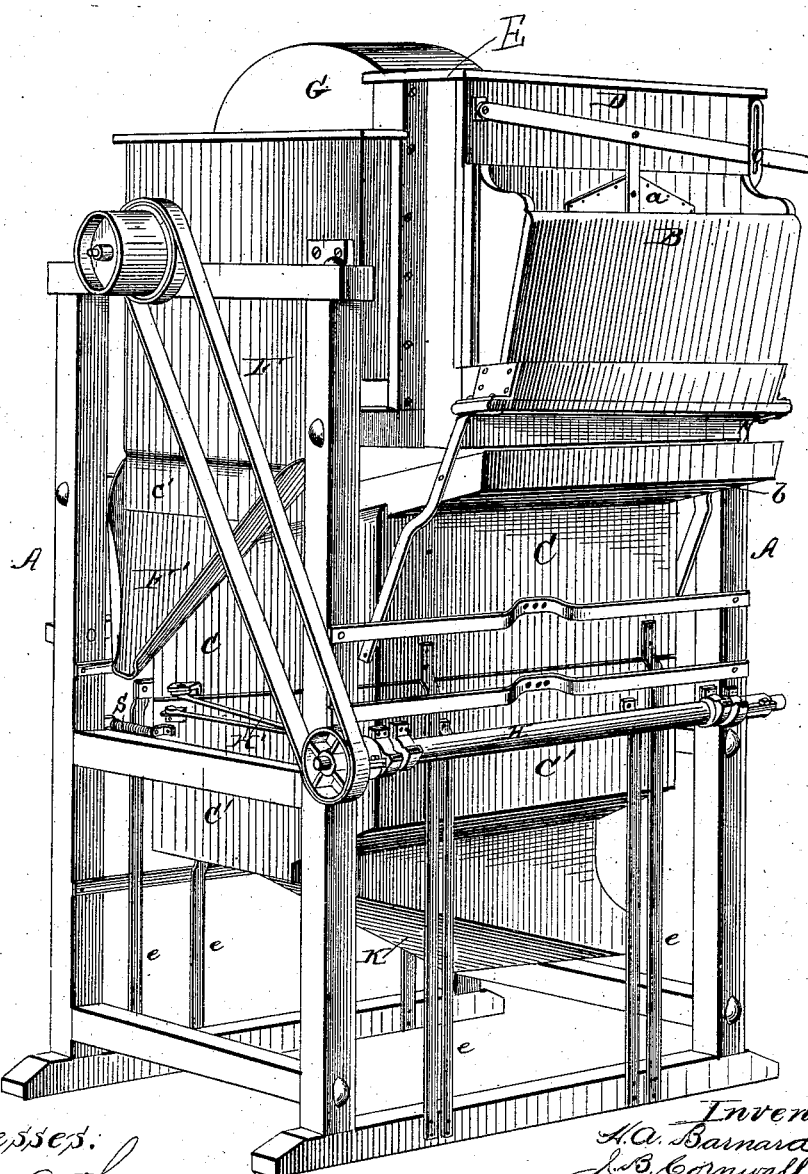
Figure 2:
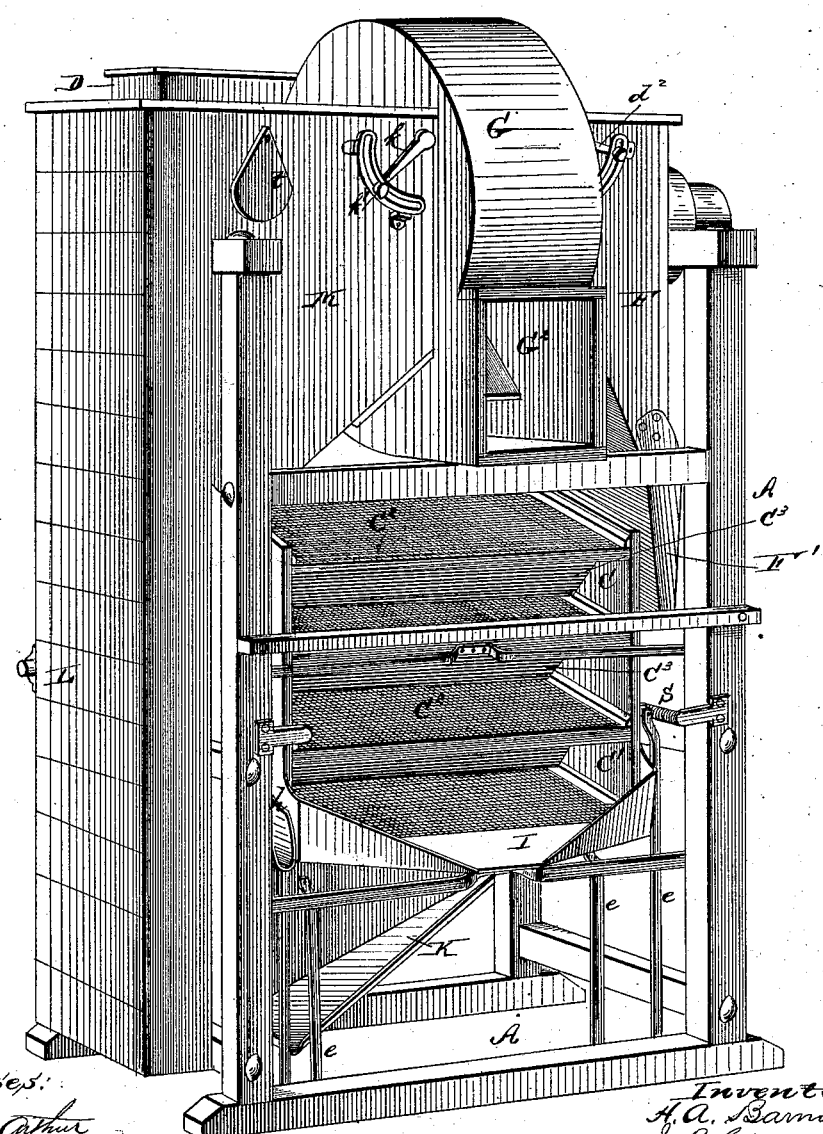
Figure 3:
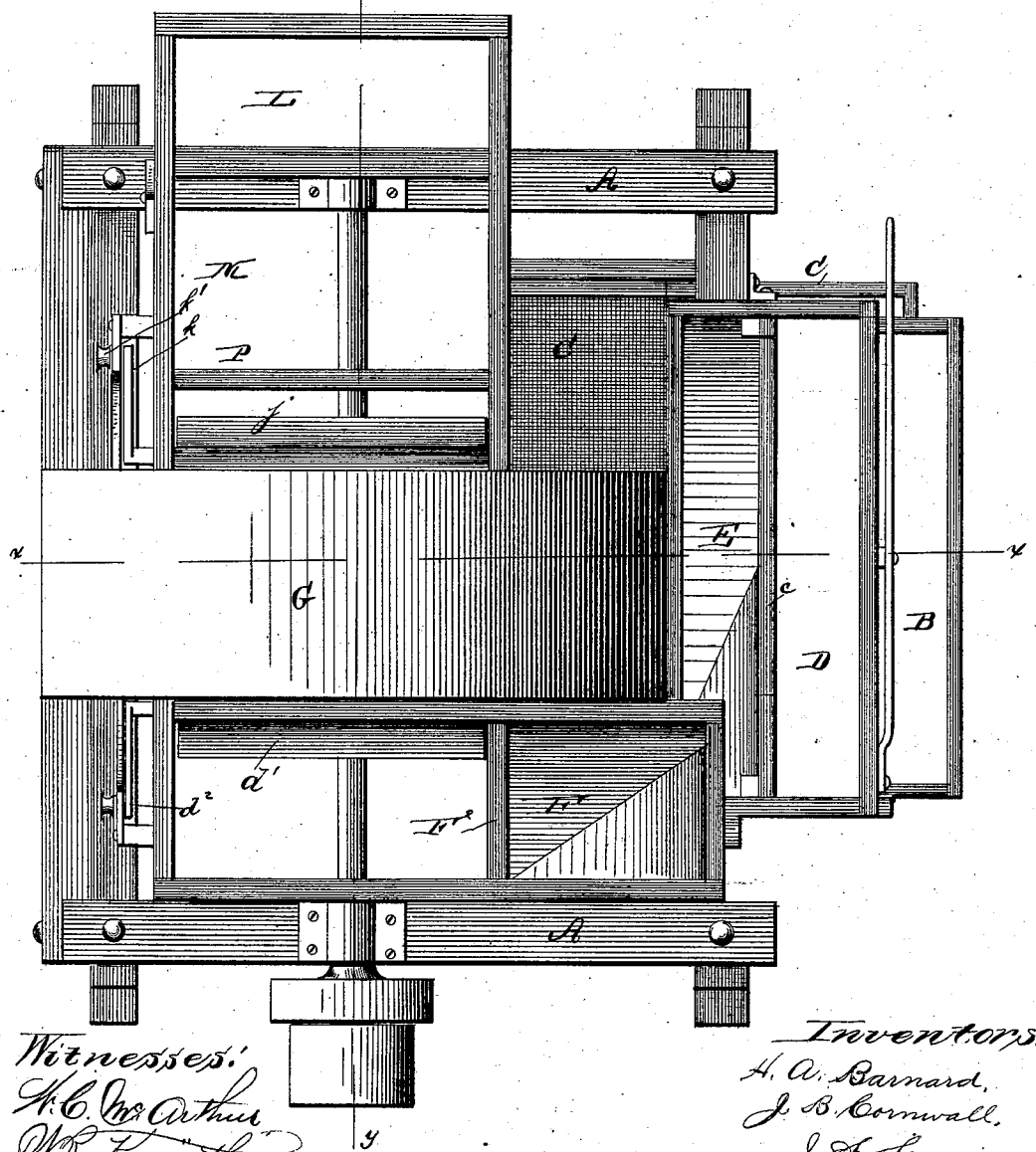
Figure 4:
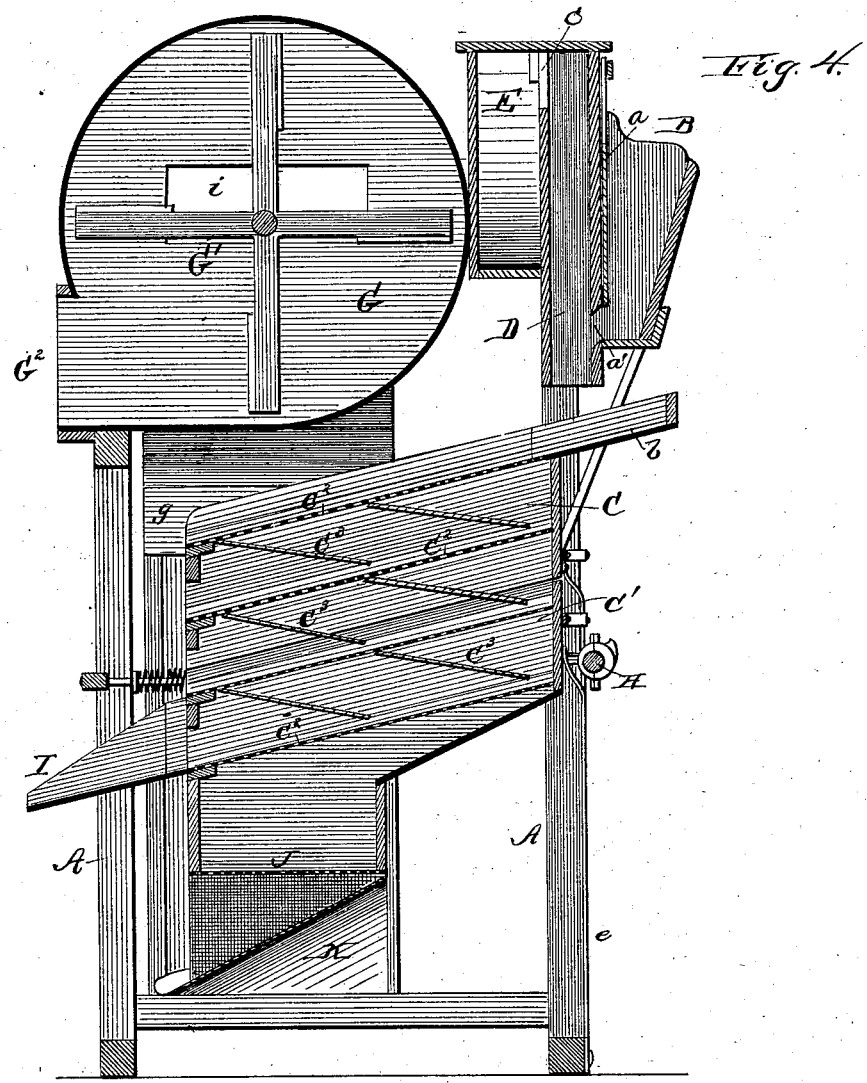
Figure 5:
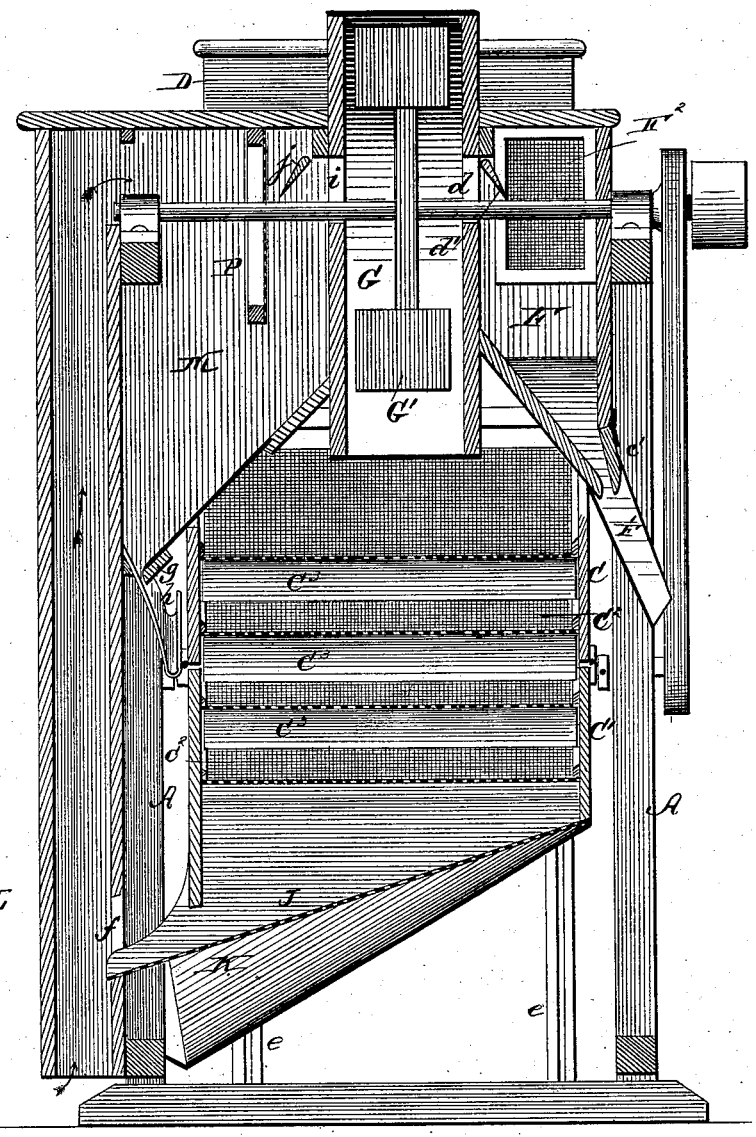

Figure 1 is a perspective view of the improved separator as viewed from the side on which the feed and distributing hopper is located. Fig. 2 is a similar view of the opposite side of the machine. Fig. 3 is a top view with the covers of the several screenings-boxes and the discharge-trunk removed. Fig. 4 is a vertical section through the machine, taken in the plane indicated by dotted line $xx$ on Fig. 3. Fig. 5 is a vertical section taken in the plane indicated by dotted line $yy$ on Fig. 3.

Similar letters of reference indicate corresponding parts.

Our invention relates to machines for cleaning wheat by separating from it dust, dirt, weeds, cockle, chess, oats, and other impurities; and the main objects of our invention are to greatly increase the efficiency of such machines by the combination of two or more shakers or screens, which are caused to vibrate or reciprocate in opposite directions to each other between two variable air-chambers, and a hopper or feeder, which will distribute or spread the wheat mixed with foreign substances uniformly and laterally upon the upper screen or shaker, as will be hereinafter explained.

The following description of our invention, when taken in connection with the annexed drawings, will enable others skilled in the art to fully understand it.

A designates the main frame of the machine. Near the upper end of this frame is a feed-hopper, B, which is provided with a vertically-adjustable gate or valve, $a$, by means of which the amount of feed through a discharge-passage, $a'$, can be regulated at pleasure. This hopper B is constructed to uniformly and laterally distribute the wheat, &c., in a thin stream through said passage $a'$ and upon the imperforated plate $b$ at the highest part of the upper shaker, C, the wheat, &c., passing through the side of a vertical trunk, D, near the lower end thereof.

The trunk D communicates by means of a passage, $c$, at its upper end with a chest, E, having a laterally-inclined bottom or chute leading down into a vertical trunk, F, which is arranged on one side of a fan-case, G, in which is applied a fan, G', and from which dust from the wheat is discharged through a spout, G².

The trunk F is provided at its lower discharging end with a self opening and closing valve, $c'$, which will at times open and allow the screenings from the first separation to escape and be discharged from a chute, F'. This trunk or screenings-box F is also provided with a deflecting reticulated partition, F², which will allow dust to pass freely through it, but arrest and direct downward the screenings. The trunk F communicates by a passage, $d$, with the interior of the fan-case G, which passage is provided with a valve, $d'$, that can be adjusted by means of a lever, $d^2$, and fixed after adjustment by a set-screw on the outside of the machine, as shown in Figs. 2 and 3. By this arrangement we obtain the first separation before the wheat falls upon the upper shaker, C, and remove the dust, chaff, straw, light screenings, &c., which would be liable to choke the sieves and prevent the oats, sticks, &c., from being sifted out. These are drawn into the first screenings-trunk F and discharged, as above described.

It will be observed that the force of the wind-currents during this first separation can be varied or regulated at will by adjusting the valve $d'$.

By reference to Figs. 2, 4, and 5 it will be seen that we employ two shakers, C C', and that each shaker is provided with sieves. These shakers are broad and short, and they are supported on spring-strips $e$, secured to them and to the main-frame sills, so that the shakers can be reciprocated independently of each other by means of eccentrics on a rotary shaft, H, and connecting-rods H'. The shakers are so supported that they practically move in planes parallel to each other, and the eccentrics are so arranged on their shaft that the shakers are vibrated in opposite directions. Thus it will be seen that the motion of one shaker has the effect of counterbalancing the motion of its fellow. The effect of these motions is to obtain a smoother vibration when running at a high rate of speed, which will prevent the sieves from being clogged, even when sieves of very small mesh are used.

By the use of the counterbalancing-shakers, in combination with air separating-trunks, we are able to increase the capacity of a separator to a greater extent than can be done in any other way, and at the same time increase its efficiency. We are enabled to make and handle sieves or shakers so much wider than ever used before that we can spread or deliver the wheat evenly to a very wide air separating-trunk and remove oats from spring wheat in a practical and thorough manner.

The alternate vibrating motions given to the shakers will be rendered more regular and smoother by the use of spring-abutments or coiled springs applied as shown in Figs. 1 and 2, and lettered S. The material passes over the surfaces of the four screens or sieves $C^2$ of the two shakers, the grain and cockle passing through these sieves, from one to the other, and being directed upward and backward by the inclined boards or plates $C^3$. The second separation is thus obtained by the nest of sieves of the shakers. The wheat passing through the same is cleaned of sticks, weeds, stones, and oats, which are discharged from the machine by the chute I, Figs. 2 and 4.

After the wheat leaves the last one of the inclined screens or sieves $C^2$ it falls upon a cockle-riddle, J, of the lower shaker, C', which separates the cockle, wild buckwheat, grass-seed, sand, &c., from the wheat, and these foreign matters fall upon a laterally-directed chute, K, and are discharged from the machine. The wheat passes from the cockle-riddle by a side motion and in a broad thin stream, and is discharged through a passage, $f$, into a large vertical separating-trunk, L, a short distance above the lower open end thereof. The third separation takes place on the cockle-riddle, as above described.

The fourth and last separation takes place in the vertical trunk L, and in this trunk the thin and broad stream of wheat is subjected to a strong upward suction of wind-currents, which take the course indicated in Fig. 5 by the arrows. These currents of air separate all remaining substances from the good wheat, such as chess, cockle, shrunken wheat, wild buckwheat, smut-balls, oats, &c. These substances are drawn up the trunk L and into a screenings box, M, while the wheat falls from the bottom of the trunk into a suitable receptacle.

The screenings-box M discharges its heavier particles from its inclined bottom through a passage which is provided with a self opening and closing valve, $g$, and said particles are received into an inclined spout, $h$, and thereby discharged from the machine. The said box M is provided with a deflecting-screen, P, against which the heavier particles strike and are directed downward, while the dust passes through this screen and enters the fan-case G through a passage, $i$, provided with a regulating-valve, $j$.

The valve $j$ can be adjusted by means of a lever, $k$, and fixed by a set-screw, $k'$. (Shown in Figs. 2 and 3.)

A valve or damper, $t$, (shown in Fig. 2,) is used for modifying the force of the upward currents of air through the trunk L. This valve covers an aperture leading into the second sceenings-box M.

It will be seen that we have two independent screenings-boxes arranged on opposite sides of the fan-case, and communicating with its interior by means of passages provided with regulating-valves. By this arrangement the two separations are kept separate and are regulated independently of each other.

It will also be seen that we have two variable or adjustable suction-blast or wind separating-chambers, and an intermediate nest of separating screens or sieves, which are applied to two shakers that receive alternate reciprocating movements for the purposes above described.

Having described our invention, we claim—

1. The combination, in a grain-separator, of screening-shakers and means for vibrating them in opposite directions, with two independent air-chambers, each of said chambers being provided with a cut-off or valve, all substantially as and for the purpose set forth.

2. The combination, in a grain-separator, of a fan, a suitably-constructed fan-case, and wind separating-chambers provided with independent valves, with a set of screening-shakers and means for vibrating them in opposite directions, all substantially as and for the purpose described.

3. The combination, in a grain-separator, of sieves and means for vibrating them in opposite directions, with two separating-chambers, each provided with a screenings-box to collect and discharge the screenings automatically, and also a valve to regulate the force of the air-current, all constructed and arranged to operate substantially as and for the purpose set forth.

In testimony that we claim the foregoing as our own we affix our signatures in presence of two witnesses.

HEMAN A. BARNARD.
JOHN B. CORNWALL.
J. SILAS LEAS.

Witnesses:
J. S. GILLMORE,
WM. C. BENNETT.